Aug. 17, 1926.
F. P. MILLER
1,596,063
INSERTED BLADE CUTTER HEAD
Filed Nov. 21, 1922
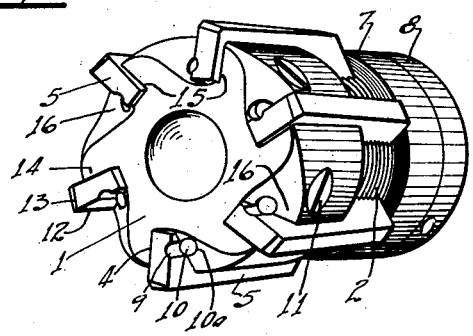
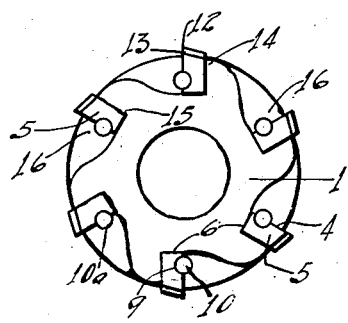
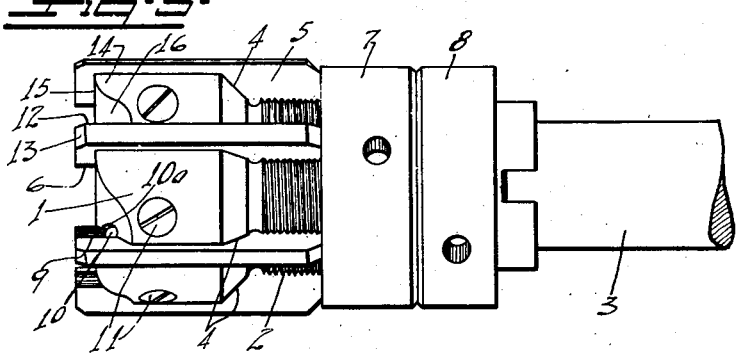
Inventor
Frank P. Miller
Attorney Patented Aug. 17, 1926.

1,596,063

UNITED STATES PATENT OFFICE.

FRANK P. MILLER, OF MEADVILLE, PENNSYLVANIA.

INSERTED-BLADE CUTTER HEAD.

Application filed November 21, 1922. Serial No. 602,372.

This invention is designed to improve inserted blade cutter heads and as shown is in the form of a reamer. With such reamers the cutting blades must project from the carrier and the effort in the construction is to so support these blades as to make them rigid with the carrier and to brace them with the carrier so that they will sustain the cutting strain. At the same time it is essential that sufficient chip clearance should be provided in front of the cutting edges and particularly that part of the cutting edge into which the heavier chip passes. In the present invention I provide a backing for the blade and at the same time a clearance space giving to the carrier between the blades a compound curve convex adjacent to the backing of the blade, thus sufficiently bracing the blade to sustain the cutting strain and concave adjacent to the next succeeding blade, thus supplying ample chip clearance.

The invention is illustrated in the accompanying drawings as follows:—

Fig. 1 shows a perspective view of the reamer.

Fig. 2 an end view of the reamer.

Fig. 3 a side elevation of the same.

The reamer in general construction is similar to that shown in my Patent #1,431,831 issued Oct. 10th, 1922. 1 marks the blade-holding portion of the carrier, 2 the screw-threaded portion, and 3 the shank. The carrier is provided with the usual blade-receiving grooves 4 in which are arranged the cutting blades 5. These blades have the tapered ends 6 so that by sliding them along the groove the diameter of the cutter as a whole is expanded. A collar 7 is screwed on to the portion 2 and forms a backing for the rear ends of the blades and this is locked in adjustment by the jamb nut 8. Each of the blades have a locking groove 9 along one face and a pin 10 extends in this groove and a groove 10ª in the walls of the groove 4. The pin 10 is forced against the walls of the groove 9 by a screw 11. The blades are provided with a radial cutting edge 12, the blade being inclined therefrom circumferentially to give sufficient cutting clearance and the ends of the blades have the cutting edges 13.

The end of the carrier between the blades is formed with a compound curve forming a backing 14 backing the blade circumferentially and a backing 15 following down along the end of the blade, the compound curve having a convex surface 16 viewed axially and radially and merging into a concave surface viewed axially and radially immediately in front of the next succeeding blade. Thus there is an ample backing for the back of the blade and sufficient metal to prevent the springing of the carrier or blade under the strain of the cut. On the other hand the concave portion gives a very large chip clearance for that part of the next succeeding blade taking off the major portion of the chip.

While I have shown a particular form of securing blade it will be understood that the invention is not limited to this particular manner of securing the blades in the reamer.

What I claim as new is:—

In an end cutting inserted blade cutter head, the combination of a carrier having a plurality of cutter receiving grooves; and a cutter secured in each groove, each cutter having a cutting edge, the carrier at one side of each cutter being formed adjacent its end with a recess forming an ogee curve as viewed in side elevation which is normal to the wall of the groove at each intersection and in radial section diminishing to disappear at the inner wall of the groove.

In testimony whereof I have hereunto set my hand.

FRANK P. MILLER.